United States Patent Office 3,105,047 Patented Sept. 24, 1963

1

3,105,047
HYDRAULIC FRACTURING FLUID

James R. Miller and Dan H. Willson, Baytown, Tex., assignors, by mesne assignments, to Jersey Production Research Company, Tulsa, Okla., a corporation of Delaware No Drawing. Filed Aug. 11, 1960, Ser. No. 48,819
2 Claims. (Cl. 252—8.55)

This invention relates to operations performed in wells. More particularly, this invention relates to the treatment of fluids such as hydraulic fracturing fluids used in fracturing subsurface formations to increase or initiate the production of oil from the fractured formation.

If a well has oil to produce and sufficient reservoir pressure to flow the oil to any fractures, additional oil can be produced as a result of fracturing.

Well fracturing is the splitting of rock by pressure. Hydraulic pressure applied to the rock of the well bore creates compressive forces around the hole. When these forces become great enough, they force the rock apart and start the split which is lengthened by the fluid pumped into the hole.

A good fracturing fluid must have, among other things, the following characteristics:

(1) It must be fluid enough to be easily pumped by the usual well completion pumps.

(2) It must be capable of holding a propping material, such as sand, in suspension while being pumped down the well but it also must be capable of depositing the propping material in the cracks of the formation.

(3) It must flow into the cracks in the formation, but there should be a minimum of fluid loss into the pores.

(4) It must not plug the pores of the formation permanently or the capacity of the formation to produce oil will be damaged.

(5) It must be compatible with the hydrocarbon production from the well being fractured under the pressure and temperature conditions found in the well bore.

Some lease oils and some refined oils, without the addition of agents thereto, possess enough of the desired characteristics to permit their use as fracturing fluids under some conditions. Some oils do not cause serious damage to the formation. However, in order to use these lease oils and refined crude oils, the pump rates necessary to keep the sand or other propping material in suspension must be very high. These high pump rates are often impossible because of the limitations of available pumping units. This is particularly so when pumping through tubing or small diameter casing. Such tubing and small diameter casing are found in various kinds of wells, as, for example, the permanent completion-type well wherein a tubular member is permanently placed within the well with its lower extremity located above the bottom of the well. Thus, most oils require the addition of one or more agents to achieve the desired results.

A good fracturing fluid must be easily pumped down the well, as formerly explained. A good fracturing fluid must also be capable of holding a propping material such as sand in suspension while being pumped down the well. This fracturing fluid must deposit the sand in the cracks of the formation in order to hold the cracks open. In general, the higher the viscosity of the fracturing fluid, the better the fluid for purposes of sand suspension. The higher viscosity fracturing fluids tend to hold the sand in suspension as the fracturing fluid is pumped into the well. The reason for holding the sand in suspension is to prevent the sand from settling into the bottom portion of the resulting fracture. Also, a good sand suspending fracturing fluid prevents the sand from bridging across the fracture. If no bridging of the sand occurs or the

2 sand does not settle to the bottom of a fracture, a longer fracture is obtained and a better propping of the fracture. Unfortunately, however, if a high viscosity fracturing fluid is used because of its better sand suspension and antibridging capacity, the power requirement of the pumps is higher than the power requirement of the pumps if a low viscosity fluid is used. With high viscosity fracturing fluids, the effective power at the depth at which fracturing is to be made is much less than the input power at the well head. With low viscosity fracturing fluids, the effective power at the place of fracture is substantially the same as the input power at the well head. This feature is highly important when it is understood that the pressure required to make a fracture in formations having oil is approximately one pound per square inch for each foot of depth. Hence, if the fracture is to be made at a depth of 10,000 feet or greater, the effective power at the place of fracture must be at least about 10,000 pounds per square inch.

A good agent for a fracturing fluid provides a low resistance to flow as the fluid is being pumped into the well and thus acts as a low viscosity fluid and yet provides sufficient strength to hold the propping material, such as sand, in suspension as the fluid is being pumped into the well in the fracture, thus acting in this capacity as a high viscosity fracturing fluid.

In addition to being easily pumpable and capable of holding the propping material in suspension, a good fracturing fluid must also flow into the cracks as they are formed, but must not flow into the pores. Flow into the pores of a fracture results in waste of fluid since high fluid loss into the pores leaves less fluid available for extending the fracture. A low fluid loss into the pores leaves more fluid available for extending the fracture. The longer and more extensive the fractures, the greater the productive capacity of the well will be when returning to production.

A still further requirement is that the pores must not be plugged permanently or the capacity of the formation to produce oil, when the well is returned to production, will be damaged.

A further very important desirable characteristic of a good fracturing fluid in addition to the characteristics set out above is that the fracturing fluid have a relatively high viscosity index. A high viscosity index means that the fracturing fluid undergoes a relatively small change in viscosity with a change in temperature. A low viscosity index means that the fracturing fluid undergoes a relatively great change in viscosity with a change in temperature. This feature is very important in using fracturing fluids in wells, particularly deep wells, where the temperature increases with depth of the well. It is common in wells for the temperature at the place of fracturing to reach 125° F. or higher.

Currently, high viscosity oils, which contain a large amount of saturates and a small amount of aromatics, are used to obtain the desired high temperature characteristics down the hole. High viscosity oils of this type have a relatively high viscosity index. However, these oils still are too thick to pump easily at medium or low atmospheric temperatures and they frequently contain harmful asphalt or bottom sediment and water. The asphalt and bottom sediment frequently cause irreparable damage to the productive capacity of the fractured formation. In addition, they are often incompatible with crude and can cause precipitation of asphalt due to their paraffinic nature. However, in the past, workers skilled in the art of fracturing have felt it necessary to use these high viscosity, relatively high viscosity index oils because if a low viscosity refined oil or crude is used, though they can be pumped more easily, the low viscosity causes the propping material, such as sand, to settle and hence not flow into the cracks formed in the formation. Workers skilled in the art would like very much to have a fracturing fluid which acts like a low viscosity fluid as it is being pumped down the well and yet acts like a high viscosity fluid when the pumping is stopped after the fracture has been made. This fracturing fluid should also have a high viscosity index so as to be relatively unchanged in viscosity at the higher borehole temperatures. Of course, in addition, the fracturing fluid should not cause damage to the fractured formation, and should be compatible with crude oil under conditions found in well bores. We have discovered a new fracturing fluid which provides the art with a fracturing fluid which has these desired characteristics.

Briefly described, our invention comprises a hydrocarbon carrier fluid having an aromatic content ranging from 35 to 95 weight percent and a viscosity index improver having an active ingredient and a diluent oil. The viscosity index improver may be added to the hydrocarbon carrier fluid in amounts ranging from 0.1 to 10 volume percent of the hydrocarbon carrier fluid. A volume percent ranging from 1 to 3 volume percent is the preferred range.

We have made the startling discovery through extensive study and tests that a highly superior fracturing fluid results from the inclusion of very small amounts of a viscosity index improver in a hydrocarbon carrier fluid having a relatively low viscosity and low viscosity index. The hydrocarbon carrier fluid has a high aromatic content usually ranging from 35 to 95 weight percent of aromatics which makes it compatible with almost all crudes under bottom hole conditions of pressure and temperature. These fluids also do not have the harmful asphalt and bottom sediment and water. The fracturing fluid has all of the desired qualities described above. When not being pumped, the viscosity index improver in the fracturing fluid has sufficiently high viscosity to keep the sand in suspension. Nevertheless, when the fluid is being pumped, the viscosity index improver experiences temporary shear breakdown. Thus, the fluid is easily pumped and practically all of the power from the pump is transmitted as effective power to the location in a hole at which the fracturing is to be made. It has further been found that no damage is done to the formation by this fracturing fluid and that it is compatible with crudes.

This new fracturing fluid is very effective in holding sand in suspension as it is being pumped down the well and into the cracks formed by the fracturing operation. Thus, bridging and falling out of the sand is substantially eliminated. If pumping is stopped, the sand is still held in suspension.

When using some crudes and refined oils having the aromatic content ranging from 35 to 95 weight percent, it may be necessary to add a small amount of a fluid-loss additive to prevent fluid from being lost into the pores of the formation. One example of an effective fluid-loss additive which may be used is that described in patent application Serial No. 791,363, filed February 5, 1959, by Morris R. Morrow et al., entitled "Treatment of Wells."

One series of the many tests performed on this new fracturing fluid is shown in the attached Table I.

TABLE I

*Inspections on V.I. Improver /Extract Blends*

| Blend Number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Blend Composition, Wt. Percent: | | | | | | | | | | | | | | |
| Extract A | 100 | 99.0 | 98.5 | 95.0 | 99.0 | 98.5 | 95.0 | | | | | | | |
| Extract B | | | | | | | | 100 | 99.0 | 98.5 | 95.0 | 99.0 | 98.5 | 95.0 |
| Polyisobutylene V.I. Improver | 0 | 1.0 | 2.5 | 5.0 | | | | 0 | 1.0 | 2.5 | 5.0 | | | |
| Methacrylic V.I. Improver | 0 | | | | 1.0 | 2.5 | 5.0 | 0 | | | | 1.0 | 2.5 | 5.0 |
| Inspections: | | | | | | | | | | | | | | |
| SSU/100° F | 133.6 | 198.6 | 339 | 699 | 266 | 563 | 1,210 | 483 | 657 | 855 | 1,784 | 853 | 1,550 | 2,931 |
| SSU/210° F | 38.5 | 44.5 | 56.7 | 90.9 | 51.4 | 84.6 | 175.6 | 52.1 | 62.5 | 75.8 | 145.5 | 75.9 | 135.1 | 276 |
| V.I | −88 | 63.8 | 110.1 | 126.4 | 106.5 | 132.8 | 135.1 | 5.3 | 54.0 | 80.2 | 112.8 | 80.9 | 114.5 | 1,245 |
| Viscosities in cs. at— | | | | | | | | | | | | | | |
| 100° F | 28.3 | 42.7 | 73.1 | 150.8 | 57.3 | 121.5 | 261.1 | 104.2 | 141.8 | 184.6 | 385 | 184.0 | 334.5 | 632 |
| 125° F | 15.0 | 22.8 | 39.6 | 81.9 | 31.5 | 68.9 | 150.8 | 46.2 | 64.6 | 86.3 | 183 | 85.1 | 161.6 | 323 |
| 210° F | 3.70 | 5.57 | 9.24 | 18.20 | 7.69 | 16.68 | 37.3 | 7.90 | 10.90 | 14.44 | 30.7 | 14.48 | 28.4 | 59.1 |

Extract A, shown in Table I, is an extract obtained when solvent treating a lube distillate obtained from coastal crude. Extract A contains about 30.1 weight percent saturates and about 69.9 weight percent aromatics. Extract A has no asphaltenes.

Extract B of Table I is a neutral extract obtained from phenol treating a lube distillate from Mid-Continent crude. Extract B contains about 28.3 weight percent saturates and about 68 weight percent aromatics. Extract B contains no asphaltenes.

The polyisobutylene viscosity index improver used in the tests set out in Table I consisted of polyisobutylene polymer in a diluent oil. The diluent oil comprised approximately 80 percent by volume of the viscosity index improver. The methacrylic viscosity index improver of Table I included methacrylic polymer as the active ingredient in a diluent oil ranging from about 60 percent to 80 percent by volume.

Notice from Table I that Extract A with no viscosity index improver had the very low viscosity index of −88. The addition of only 1 percent by weight which is 1.09 percent by volume of the methacrylic viscosity index improver increased the viscosity from a −88 to a +106.5 viscosity index. This is obviously a very marked and unexpected increase with such a small amount of viscosity index improver. The addition of only 1 percent by weight or 1.10 percent by volume of the polyisobutylene viscosity index improver changed the viscosity index from the −88 to a +63.8. This is also a marked and unexpected improvement. The unexpected improvement also occurred with the addition of small amounts of the polyisobutylene and methacrylic polymer improvers to Extract B. The viscosity index of Extract B with no improver added was 5.3. The addition of 1 percent polyisobutylene viscosity index improver increased the viscosity index from 5.3 to 54. The addition of 1 percent methacrylic polymer increased the viscosity index from 5.3 to 80.9.

One requirement established by some workmen skilled in the art of fracturing fluid is that the fracturing fluid should have a maximum viscosity in cs. at 100° F. of 150 and a minimum viscosity in cs. at 125° F. of 40. Looking again at Table I, it can be seen that a weight percent range of 2.75–5.0 or 3.02–5.48 volume percent range of the polyisobutylene viscosity index improver added to Extract A would provide a fracturing fluid having the required 150 maximum viscosity at 100° F. and 40 minimum at 125° F. The V.I. range is 112–126. The addition of the polyisobutylene V.I. improver to the Extract B of up to 1.25 weight percent or 1.35 volume percent provides the necessary 150 maximum at 100° F. and 40 minimum at 125° F. with a V.I. ranging up to 60.

Table I further shows that the addition of the methacrylic V.I. improver to the Extract A ranging from 1.5–2.75 weight percent or 1.63–2.99 volume percent to Extract A provides the required maximum at 100° F. and minimum at 125° F. with a viscosity index range of 120–133. The addition of up to 0.5 weight percent or 0.53 volume percent of the methacrylic V.I. improver to the Extract B provides the required maximum and minimum with a V.I. ranging up to 53.

The same improved results can be obtained using as a hydrocarbon carrier fluid a lease oil rather than a refined oil so long as the lease or crude oil has the aromatic content range of 35 to 95 weight percent. However, a larger percentage by volume of viscosity index improver must be added to the crude oil to obtain the desired viscosity levels. This may amount to as much as 10 volume percent of viscosity index improver in the crude oil-hydrocarbon carrier fluid.

In performing fracturing operations, a petroleum oil having the aromatic content ranging from 35 to 95 weight percent is forced into the well bore under pressure and into the cracks formed in the producing formation. The petroleum oil having the aromatic content ranging from 35 to 95 weight percent has been treated to improve its viscosity and viscosity index characteristics by the incorporation in the oil of a viscosity index improver with the methacrylic improver and polyisobutylene improver being preferred with the amount of the viscosity index improver ranging from 0.1 to 10 volume percent of the petroleum oil.

We claim:

1. In a process of working a well, the steps of: pumping a petroleum oil into said well, said petroleum oil consisting essentially of an aromatic content ranging from 35 to 95 weight percent and a viscosity index improver having a methacrylic polymer in a diluent oil, said viscosity index improver ranging from 0.1 to 10 volume percent of the petroleum oil; and contacting the faces of subsurface formations exposed to the well bore with said petroleum oil having said viscosity index improver incorporated therein under sufficient pressure to cause fractures in said subsurface formations.

2. In a process of working a well, the steps of: pumping a petroleum oil into said well, said petroleum oil consisting essentially of an aromatic content ranging from 35 to 95 weight percent and a viscosity index improver having a polyisobutylene polymer in a diluent oil, said viscosity index improver ranging from 0.1 to 10 volume percent of the petroleum oil; and contacting the faces of subsurface formations exposed to the well bore with said petroleum oil having said viscosity index improver incorporated therein under sufficient pressure to cause fractures in said subsurface formations.

References Cited in the file of this patent

UNITED STATES PATENTS

| | | |
|---|---|---|
| 2,697,071 | Kennedy et al. | Dec. 14, 1954 |
| 2,743,233 | Fischer | Apr. 24, 1956 |
| 2,801,967 | Wilson | Aug. 6, 1957 |
| 2,946,748 | Steiner et al. | July 26, 1960 |
| 2,966,401 | Myerholtz | Dec. 27, 1960 |
| 2,966,457 | Starmann et al. | Dec. 27, 1960 |
| 3,046,222 | Phansalker et al. | Jan. 24, 1962 |

OTHER REFERENCES

Georgi: Motor Oils and Engine Lubrication, (1950) Reinhold Pub. Co., N.Y., pages 196 to 201.

Kalichevsky et al.: Petroleum Refining With Chemicals, 1956, Elsevier Publ. Co., N.Y., pages 541 to 548.